United States Patent [19]

Markarian

[11] 4,398,782
[45] Aug. 16, 1983

[54] INTERRUPTER FOR MULTISECTION AC CAPACITORS

[75] Inventor: Paul M. Markarian, North Adams, Mass.

[73] Assignee: Sprague Electric Company, North Adams, Mass.

[21] Appl. No.: 254,339

[22] Filed: Apr. 14, 1981

Related U.S. Application Data

[63] Continuation-in-part of Ser. No. 238,314, Feb. 26, 1981.

[51] Int. Cl.³ .............................................. H01G 1/14
[52] U.S. Cl. .......................... 339/147 C; 339/218 C; 361/15; 361/306
[58] Field of Search .................. 361/15, 272, 306, 433, 361/271, 328; 339/147 C, 218 C, 220 C, 221 R

[56] References Cited

U.S. PATENT DOCUMENTS

| | | | |
|---|---|---|---|
| 3,248,617 | 4/1966 | Hynes et al. | 317/242 |
| 3,377,510 | 4/1968 | Rayno | 317/12 |
| 4,106,068 | 8/1978 | Flanagan | 361/15 |
| 4,107,758 | 8/1978 | Shirn et al. | 361/275 |

FOREIGN PATENT DOCUMENTS 1577904  10/1980  United Kingdom .

*Primary Examiner*—Mark Rosenbaum

[57] ABSTRACT

An interrupter for a multisection AC capacitor is a molded disc of polyphenylene sulfide. The disc has three holes in it in an equilateral triangular array, and one side of the disc is flanged around its periphery. The other side of the disc has three main ribs extending outwardly from the center and dividing the disc into three equal sections, each containing one of the holes. Lateral ribs extend from each side of the main ribs at 60° to the main rib and approximately 25% of the length of the main rib from the center of the disc.

5 Claims, 2 Drawing Figures

INTERRUPTER FOR MULTISECTION AC CAPACITORS

CROSS REFERENCE TO RELATED APPLICATION

This application is a continuation-in-part of application Ser. No. 238,314 filed Feb. 26, 1981.

BACKGROUND OF THE INVENTION

This invention relates to an interrupter for a multisection AC capacitor, and more particularly to an interrupter for a round dual-section AC capacitor.

Dual- or multisection AC capacitors are often used for AC motor-start or motor-run service. Failures of such capacitors generally are the result of pressure buildup within the capacitor. Various safety devices including circuit interrupters have been incorporated into such capacitors to render them inoperative when the pressure builds up.

Generally, these interrupters are non-flexible plates through which the ends of the terminals extend. Electrode tabs from the capacitor or capacitors are attached to these terminals beneath the plate. When pressure builds up in the unit, the cover starts to dome or bulge pulling the terminals away from the plate and causing the electrode tabs to become disconnected from the terminals and disconnecting the unit.

These capacitors are generally oval in shape, particularly those employing three terminals. When round units have been used, they have generally been larger than 2.5 inch (63.5 mm) diameter. In the former design, the terminals have been arranged in a line along the long axis that is also the crest of the dome or bulge resulting from pressure buildup. With round units, the terminals are offset from this crest line, and therefore in an area of less deflection. In order to insure that at least two of the three terminal-tab connections are broken in response to the same pressure buildup even though less cover deflection, spacers have been used between the interrupter and cover so that the required disconnection will result even with less vertical movement.

The problem becomes more acute when the terminals in a round cover must be spaced farther away from the center in order to meet Underwriters Laboratories minimum spacing requirements as described in copending application Ser. No. 238,314, filed Feb. 26, 1981, of which this application is a continuation-in-part.

SUMMARY OF THE INVENTION

This invention provides for a round interrupter disc to be used with round multisection AC capacitor units that will insure the disconnection of at least two terminals under pressure buildup conditions even when these terminals are spaced away from the center of the capacitor cover.

The invention also provides for such a disc that does not require auxiliary spacers.

The interrupter is a molded disc of a material inert to the dielectric fluid used in the capacitor. One side bears a circumferential flange or rib as deep as the spacers it replaces. The disc has three holes therein in a triangular array and so spaced as to correspond to at least the minimum terminal-terminal spacing set forth by Underwriters Laboratories.

The other side of the disc bears ribs to strengthen the disc and prevent its cracking under pressure so that the terminals will be disconnected from the electrodes instead of the disc cracking and moving with the terminals. The ribs form a symmetrical snowflake pattern.

DESCRIPTION OF THE PREFERRED EMBODIMENTS

The interrupter of the present invention is a molded disc of a material chemically inert to the dielectric fluid in the capacitor with which it is to be used. It is preferably made of Ryton, polyphenylene sulfide, a hard, rather brittle, high melting point material available from Phillips Chemical Co., Bartlesville, OK.

Figure 1:
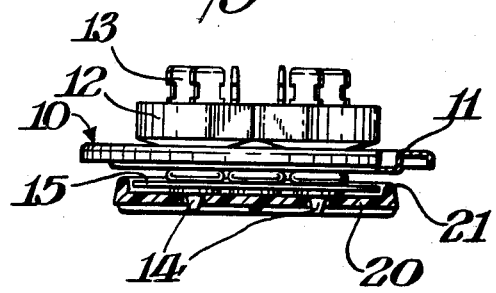
FIG. 1 is a cross-section of the interrupter and the terminal-cover assembly with which it is used.

As shown in FIG. 1, a metal capacitor cover 10 with rim portion 11 contains three bushings 12 with terminals extending through them ending in a flattened portion 14. This portion 14 extends through an insulator 15, preferably kraft, and through interrupter disc 20. Interrupter 20 has a circumferential flange 21 that encompasses and fits around insulator 15 and is of a depth of the customary spacers it replaces. An electrode tab (not shown) will be welded to each flat portion 14 of terminal 13 during assembly of the capacitor.

Figure 2:
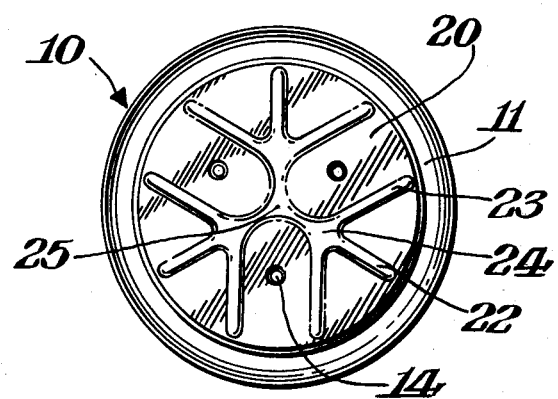
FIG. 2 is a plan view of the ribbed side of the disc and cover.

FIG. 2 shows the snowflake design on the other side of interrupter 20 with flat portions 14 extending through the holes therein. Main ribs 22 extend out from the center of interrupter 20 dividing it into three equal portions each with a hole therein. Approximately 25% of the distance from the center to the edge of interrupter 20, a lateral rib 23 extends from each side of main rib 22 at an angle of 60° thereto.

Each two adjacent lateral ribs 23 with a hole between them form an arch at junction 25 with two adjacent main ribs 22 having an internal radius of curvature of 0.25 inch (6.35 mm). Each lateral rib 23 makes a curved joint 24 with each main rib 22 with an internal radius of curvature of 0.062 inch (1.57 mm).

Junctions 24 and 25 are thickened and curved to give added strength to a "knit line", a line of weakness produced during the molding of interrupter 20 from the flow of plastic around molding pins that produce the holes for terminal portions 14. If junctions 24 and 25 are not curved and thickened, the interrupter cracks along the knit line during service and moves with the terminal instead of remaining rigid. When this occurs, the disconnection of at least two electrode-terminal connections does not take place and the capacitor remains at risk.

What is claimed is:

1. An interrupter for a round multisection AC capacitor comprises a molded disc of material chemically inert to capacitor dielectric fluid with holes therein in an equilateral triangular array, one side of said disc having a circumferential flange around its periphery and the other side of said disc bearing ribs extending outwardly from the center of said disc in a snowflake arrangement with curved ribs and curved junctions, each of said holes being located between adjacent ribs and being separated from another of said holes by said ribs.

2. An interrupter according to claim 1 wherein there are three main ribs extending outwardly from said center of said disc dividing said disc into three equal sections, and each of said main ribs having two ribs extending laterally from said main rib, one from each side thereof, and one of said holes being located in each of said three equal sections between two adjacent lateral ribs.

3. An interrupter according to claim 2 wherein said lateral ribs make an angle of 60° with said main ribs and extend from said main rib about 25% of the length of said main rib from said center.

4. An interrupter according to claim 3 whereby said adjacent lateral ribs having a hole therebetween form an arch with two adjacent main ribs with a radius of curvature of 0.25 inch, and an internal junction of a lateral rib with a main rib is also curved with radius 0.062 inch.

5. An interrupter according to claim 1 wherein said material chemically inert to capacitor dielectric fluid is polyphenylene sulfide.

* * * * *